United States Patent
Goulet et al.

(10) Patent No.: US 8,392,556 B2
(45) Date of Patent: Mar. 5, 2013

(54) SELECTIVE REPORTING OF UPSTREAM TRANSACTION TRACE DATA

(75) Inventors: Michael Goulet, Newton, MA (US); Stuart Todd Rader, Menlo Park, CA (US); Abhijit Sawant, Redwood City, CA (US)

(73) Assignee: CA, Inc., Islandia, NY (US)

( * ) Notice: Subject to any disclaimer, the term of this patent is extended or adjusted under 35 U.S.C. 154(b) by 464 days.

(21) Appl. No.: 12/504,451

(22) Filed: Jul. 16, 2009

(65) Prior Publication Data

US 2011/0016207 A1    Jan. 20, 2011

(51) Int. Cl.
*G06F 15/173* (2006.01)
(52) U.S. Cl. .................. 709/224; 709/223; 710/10
(58) Field of Classification Search .......... 709/223, 709/224; 711/10
See application file for complete search history.

(56) References Cited

U.S. PATENT DOCUMENTS

| | | | | |
|---|---|---|---|---|
| 7,631,073 B2 * | 12/2009 | Chagoly et al. | | 709/224 |
| 2005/0223048 A1 * | 10/2005 | Smith et al. | | 707/205 |
| 2006/0167891 A1 * | 7/2006 | Blaisdell et al. | | 707/10 |
| 2006/0277293 A1 * | 12/2006 | Chagoly et al. | | 709/224 |
| 2007/0214257 A1 * | 9/2007 | Kurita | | 709/224 |
| 2009/0193112 A1 * | 7/2009 | Sengupta et al. | | 709/224 |
| 2010/0153529 A1 * | 6/2010 | Moser | | 709/223 |

\* cited by examiner

*Primary Examiner* — Asghar Bilgrami
(74) *Attorney, Agent, or Firm* — Vierra Magen Marcus & DeNiro LLP

(57) ABSTRACT

Technology for monitoring transactions in a computing environment is disclosed. Execution of a transaction by a first application is monitored by a first software entity executing on a first computing device. Performance data that relates to execution of the transaction by a first application is generated. Execution of the transaction by a second application is monitored by a second software entity. The transaction is executed by the second application based on a request from the first application. A determination is made, based on the monitoring, that the first software entity should report the performance data to a third software entity that executes on a second computing device. Based on determining that the first software entity should report the performance data, data is propagated that indicates that the first software entity should report the performance data. The first software entity reports the performance data to the third software entity.

20 Claims, 8 Drawing Sheets

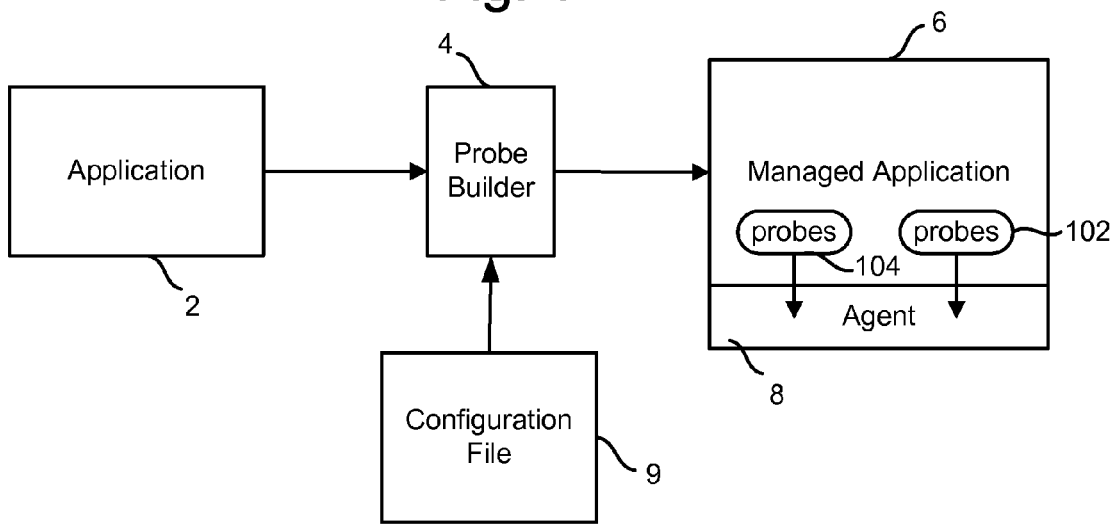
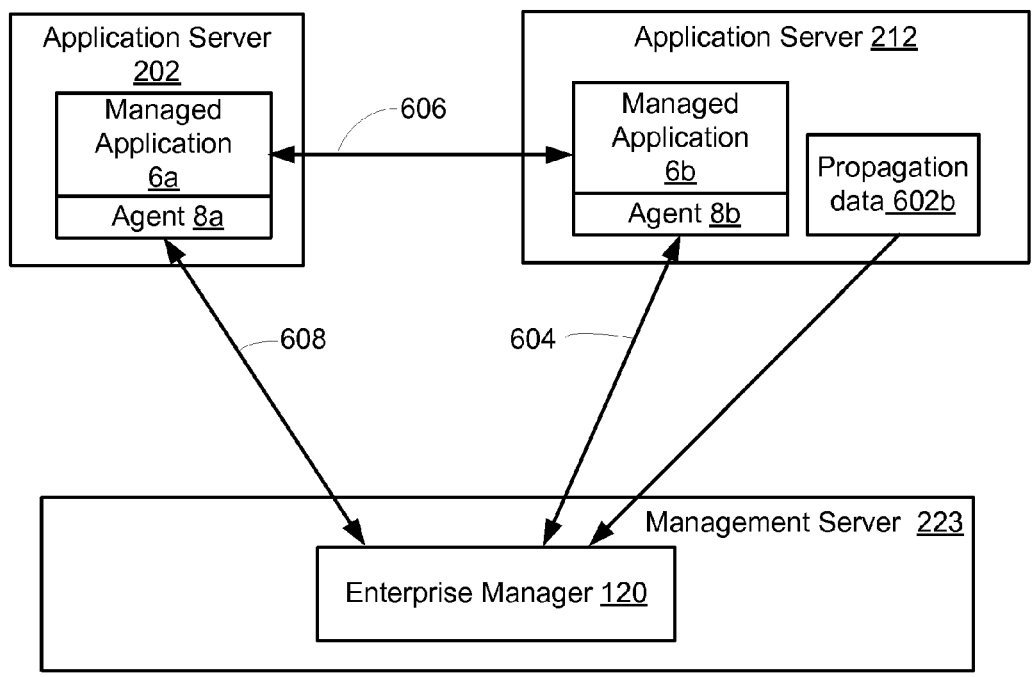

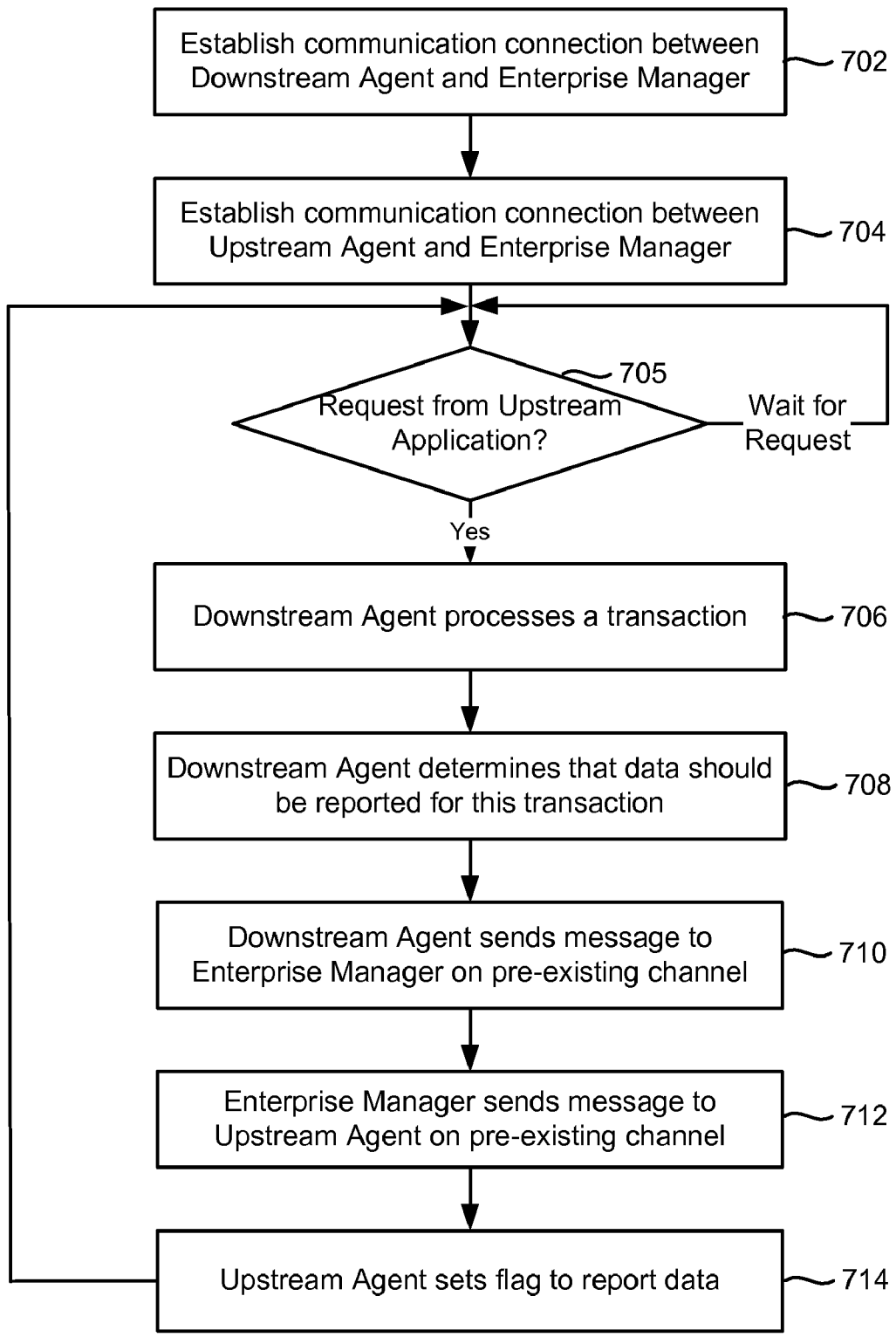

SELECTIVE REPORTING OF UPSTREAM TRANSACTION TRACE DATA

BACKGROUND

As the Internet's popularity grows, more businesses are establishing a presence on the Internet. These businesses typically set up web sites that run one or more web applications. One disadvantage of doing business on the Internet is that if the web site goes down, becomes unresponsive or otherwise is not properly serving customers, the business is losing potential sales and/or customers. Similar issues exist with Intranets and Extranets. Thus, there is a need to monitor live web applications and web sites to make sure that they are running properly.

One particular scenario that web application developers seek to avoid is a task that runs too slowly. For example, it may be expected that a task will take a fraction of one second to complete its functions; however, due to something going wrong, the task executes for thirty seconds. A task running too slowly can degrade performance of a web site, degrade performance of a web application, and cause an application to fail, or cause a web site to fail. Thus, there is a need to avoid poorly performing tasks.

Some tasks involve a transaction that may span more than one software application. Further, these applications can be executing on different computers. For example, when a costumer logs onto a vendor's web site to purchase a book, first an ordering application on the vendor's web site is invoked to do initial processing of the book order. Then, as a part of the same transaction, a credit card verification application on a remote server is contacted to verify the customer's credit card information. Additional applications can be invoked to complete the transaction.

If the transaction takes too long to complete, it can be difficult to determine where the problem exists. Technology has been developed for tracing transactions, even if the transaction is spread over multiple applications and/or computing devices. Transaction tracing helps the customers identify where the problem is along the transaction chain. For example, a transaction trace may be presented in a graphical user interface. The trace may show how much time the transaction took to execute in the different applications. Unfortunately, transaction tracing consumes resources, such as communication connections that are used to forward transaction data to a computer where the transaction trace is presented to the user. Thus, having all tracing turned on all the time may not be an acceptable proposition to customers with high volume of transactions due to the negative performance impact of reporting data on each transaction.

Thus, there is a need to improve the ability to efficiently report data about transactions.

BRIEF DESCRIPTION OF THE DRAWINGS

FIG. 1 is a block diagram describing how bytecode for an application is instrumented.

FIG. 6 is a diagram of one embodiment of a system in which a pre-existing communication connection to propagate information that other Agents should report trace data.

FIG. 7 is a flowchart illustrating one embodiment of a process of using a pre-existing communication connection is used to propagate information that other Agents should report trace data.

DETAILED DESCRIPTION

Figure 2:
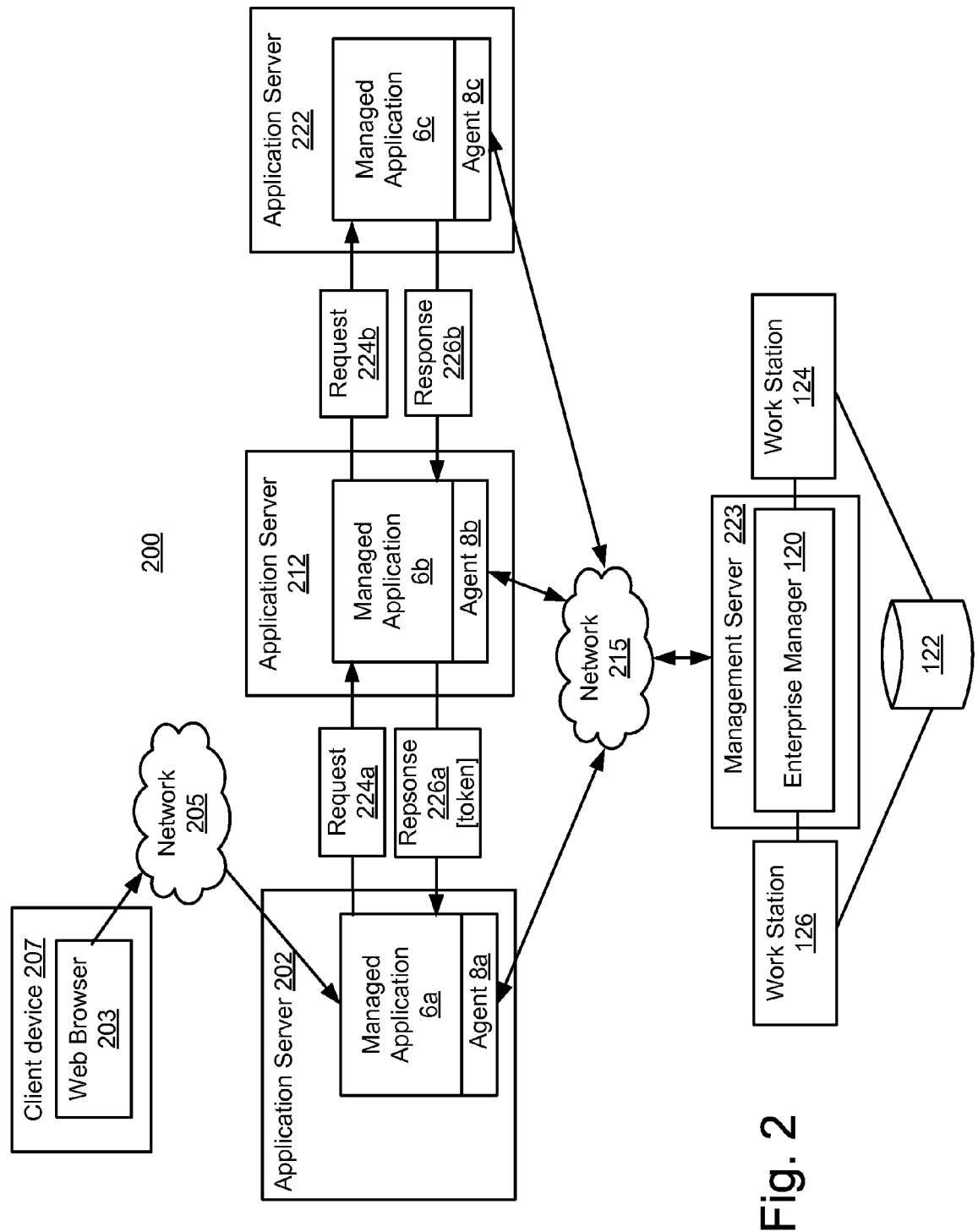
FIG. 2 is a block diagram of an embodiment of a system for monitoring a transaction that is processed by multiple applications.

Technology for monitoring transactions in a computing environment is disclosed herein. Data is collected about a transaction that executes at a "downstream" application based on a request from an "upstream" application. The collected data is then tested against a set of criteria. If the collected data meets the criteria, then performance data regarding execution of the transaction at the downstream application may be sent to a manager application. Furthermore, a token is sent in a response from the downstream application to the upstream application that indicates that performance data about execution of the transaction at the upstream application should be reported to the manager application. The performance data regarding upstream execution is reported to the manager application. Thus, an administrator is able to view performance data for the transaction as it moves through the stream. However, communication connections to the manager application are not overloaded by always reporting performance data to the manager application.

Embodiments are directed to tracing transactions that execute over multiple nodes in a stream to identify transactions that are executing poorly somewhere in the stream and report performance data for the transaction over the entire stream. However, performance data is not reported for all transactions such that system performance is not negatively impacted. In one embodiment, the system traces transactions in order to identify those transactions that have an execution time greater than a threshold time. A transaction may involve executing a method, process, procedure, function, thread, set of instructions, etc. in order to perform a task. As an example, a transaction starts when a customer accesses a web site to purchase a product. The transaction executes over multiple nodes (e.g., applications) that each execute a portion of the transaction. For example, one application allows the user to find a book, another application allows the user to add the book to a checkout list, and another application verifies the user's credit card information. Note the some applications may be different parts of the vendor's web site, while other applications could be external to the vendor's web site.

In one embodiment, the system described below can initiate transaction tracing on one, some, or all transactions managed by the system. An administrator, or another entity, can specify a threshold trace period. If a portion of the transaction that is executed at one application has its execution time exceed the threshold trace period, then trace data from the application is reported to the system. Furthermore, trace data from execution of the transaction at other applications is also reported. In one embodiment, the reporting is performed in a Graphical User Interface ("GUI") that lists all transactions exceeding the specified threshold. For each listed transaction, a visualization can be provided that enables the administrator to immediately understand which application took too much time to execute its portion of the transaction. Note that for transactions that span many applications, merely seeing which application took too much time may not provide enough information. Embodiments provide upstream trace information that shows the administrator what happened when the transaction was executed at one or more applications upstream from the application that took too long to execute. Downstream information can also be provided.

In one embodiment, the methods in a Java environment are monitored. In that embodiment, a transaction involves a method invocation in a running software system that enters the Java Virtual Machine ("JVM") and exits the JVM (and all that it calls). Note that a single transaction may execute using different programming languages, paradigms and/or environments. Note that other platforms or environments may be used. In one embodiment, the methods in a Common Language Runtime (CLR) runtime environment are monitored. As is well-known, CLR is part of the .NET framework.

There are many ways to implement embodiments. One example is to implement within an application performance management tool. One embodiment of such an application performance management tool monitors performance of an application by having access to the source code and modifying that source code. However, it is not required that the source code be modified after it is written. In some embodiments, the source code is written in a way that allows the management tool to monitor it without further modifications to the source code. For example, various probes discussed below can be incorporated into the source code when it is written.

Another type of tool performs application performance management without requiring access to or modification of the application's source code. Rather, the tool instruments the application's object code (also called bytecode). FIG. 1 depicts an exemplar process for modifying an application's bytecode. FIG. 1 shows Application 2, Probe Builder 4, Application 6 and Agent 8. Application 6 includes probes, which will be discussed in more detail below. Application 2 is the application before the probes are added. Collectively, the probes 102 and agent 8 may be referred to as monitoring software.

Probe Builder 4 instruments (e.g. modifies) the bytecode for Application 2 to add probes and additional code to Application 2 in order to create Application 6. The probes measure specific pieces of information about the application without changing the application's business logic. Probe Builder 4 also installs Agent 8 on the same machine as Application 6. Once the probes have been installed in the bytecode, the application is referred to as a managed application. More information about instrumenting byte code can be found in U.S. Pat. No. 6,260,187 "System For Modifying Object Oriented Code" by Lewis K. Cirne, and U.S. patent application Ser. No. 10/318,272, "Transaction Tracer," filed on Dec. 12, 2002, both of which are incorporated herein by reference in their entirety.

FIG. 2 is a block diagram of an embodiment of a system 200 for monitoring a transaction that is processed by multiple applications. The system 200 of FIG. 2 includes client device 207, network 205, application servers 202, 212 and 222, management server 223, and network 215.

Client device 207 has communication software 203 that communicates over network 205 with Managed Application 6a executing on application server 202. Network 205 may be the Internet or another WAN, LAN, internet, extranet, private network or some other network over which data may be communicated between two or more machines. The client communication software 203 could be a web browser, but other communication software could be used. The client device 207 may be any computing device such as a personal computer, laptop computer, cellular telephone, personal digital assistant (PDA), etc.

Application servers 202, 212, and 222 are computing devices that host Managed Application 6a, 6b, and 6c respectively. Applications 6a, 6b, and 6c are each a Managed Application 6. Thus, each Managed Application 6a-6c has probes (not depicted in FIG. 2) for monitoring performance of transactions executed by the Managed Application 6a-6c. The Agent 8a-8c on each server 202, 212, 222 receives data from the probes and may construct performance data for a given transaction. Agents 8a-c are capable of reporting the performance data over the network 215 to Enterprise Manager 120, which executes on the management server 223. However, reporting too much performance data from an Agent 8 to Enterprise Manager 120 may negatively impact system performance. For example, reporting too much performance data can slow down the network 215. Significantly, performance of the Managed Application 6a-6c can be negatively impacted if too much performance data is reported to Enterprise Manager 120. Technology is disclosed herein for improving performance by selectively determining which performance data to report to Enterprise Manager 120.

For purposes of illustration, an example is provided in which a user of the client device 207 is making a purchase of a book through an Internet vendor. In this example, the user connects to the Internet vendor's web site to look for a book to purchase. When the user decides to buy a book, the user starts an online payment process and the user's credit card information needs to be verified. This causes Managed Application 6a to send a request 224a to Managed Application 6b to start the verification process. Application 6b may be a software module that executes on the same or different computing device from Managed Application 6a. A part of verifying the credit card information may be to contact a credit card agency. This may involve Managed Application 6b sending a request 224b to Managed Application 6c. Eventually, Managed Application 6c sends a response 226b back to Managed Application 6b. Likewise, eventually Managed Application 6b sends a response 226a back to Managed Application 6a. Thus, processing this transaction involves sending requests 224 "downstream" and responses 226 back "upstream."

If processing the transaction is slow, it is desirable to have information collected by any of the Agents 8 such that the transaction can be traced from beginning to end. However, as already discussed, having the Agents 8 always send performance data to Enterprise Manager 120 can negatively impact performance. In some embodiments, a given Agent 8 determines whether it might be useful to have one or more of the other Agents 8 report performance data to Enterprise Manager 120. If the Agent 8 makes a determination that another Agent 8 should report performance data, then the Agent 8 propagates data that indicates that performance data should be reported.

For example, if Agent 8b determines that processing of the transaction by Managed Application 6b is too slow, then Agent 8b includes a token in the response 226a that Managed Application 6b sends back to Managed Application 6a. Agent 8a will typically already have been collecting performance data regarding the transaction. Some or all of this performance data may still be stored. Note that collecting and temporarily storing transaction performance data does not necessarily negatively impact performance of the Managed Application 6. For example, the probes that collect the performance data can be written such that the probes execute very efficiently. Moreover, storing transaction performance data for the lifetime of the transaction does not necessarily consume too much storage. Although, in some cases, the Agent 8a may discard a portion of the performance data prior to the transaction completing. Because it determined that the token was in the response 226a, Agent 8a sends whatever performance data that it has to Enterprise Manager 120. Note that had Agent 8a not received the token, Agent 8a might not be aware that there is a problem with transaction execution downstream. Furthermore, there might not be any problem with execution at Application 8a, or at least the problem might not be readily determinable by Agent 8a. Therefore, Agent 8a reports performance data that might not otherwise have been reported. However, network 215 is not overloaded by transferring too much performance data.

Enterprise Manager 120 receives the performance data via Agents 8, runs requested calculations, makes performance data available to workstations (e.g., 124 and 126) and optionally sends performance data to database 122 for later analysis. The workstations (e.g. 124 and 126) may present a graphical user interface (GUI) for viewing performance data. The workstations are used to create custom views of performance data, which can be monitored by a human operator. In one embodiment, the workstations consist of two main windows: a console and an explorer. The console displays performance data in a set of customizable views. The explorer depicts alerts and calculators that filter performance data so that the data can be viewed in a meaningful way. The elements of the workstation that organize, manipulate, filter and display performance data include actions, alerts, calculators, dashboards, persistent collections, metric groupings, comparisons, smart triggers and SNMP collections.

In one embodiment, a globally unique identifier (GUID) is associated with each transaction such that the performance data reported to Enterprise Manager 120 can be correctly associated with a particular transaction. For example, when request 224a is sent to Managed Application 6b, Agent 8a includes the GUID in the header of the request. When request 224b is sent to Managed Application 6c, Agent 8b includes the GUID in the header of the request 224b. Thus, the GUID is passed downstream with the requests 224.

It is not an absolute requirement that the Managed Applications 6a-6c execute on different computing devices. One or more of the Managed Application 6a-6c may run on the same computing device. Enterprise Manager 120 and work stations 124, 126 may run on the same or different computing devices. In one embodiment, Enterprise Manager 120 runs on the same computing device with at least one of the Managed Applications 6. In one embodiment, one or both work stations 124, 126 runs on the same computing device with at least one of the Managed Applications 6.

Any or all of these computing devices can be any of various different types of computing devices, including personal computers, minicomputers, mainframes, servers, handheld computing devices, mobile computing devices, etc. Typically, these computing devices will include one or more processors in communication with one or more processor readable storage devices, communication interfaces, peripheral devices, etc. Examples of the storage devices include RAM, ROM, hard disk drives, floppy disk drives, CD ROMS, DVDs, flash memory, etc. Examples of peripherals include printers, monitors, keyboards, pointing devices, etc. Examples of communication interfaces include network cards, modems, wireless transmitters/receivers, etc. The system running the Managed Application 6 can include a web server/application server. The system running the Managed Application 6 may also be part of a network, including a LAN, a WAN, the Internet, etc. In some embodiments, software that is stored on one or more processor readable storage devices and is used to program one or more processors.

Figure 3A:
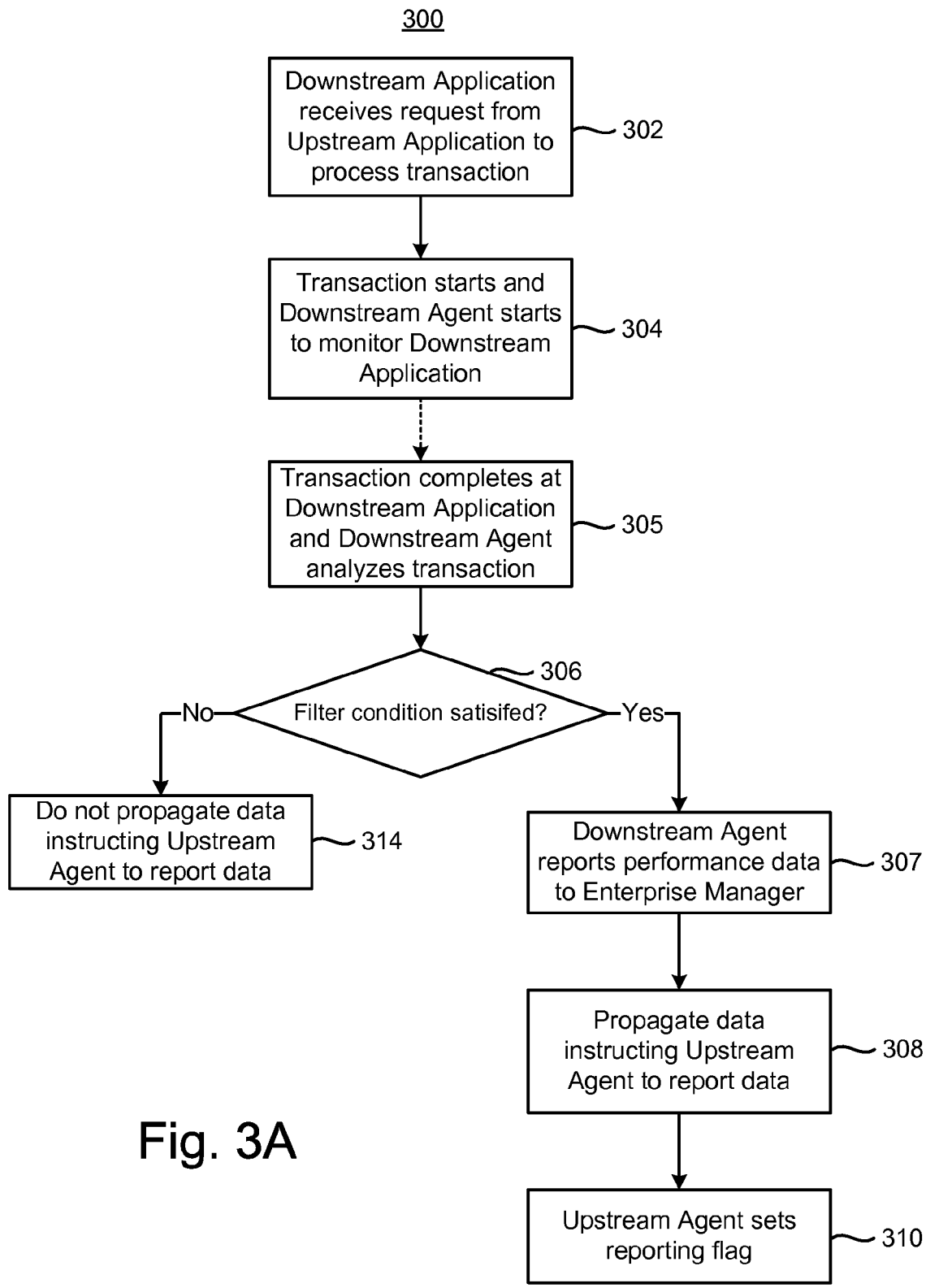
FIG. 3A is a flowchart depicting one embodiment of a process for monitoring a transaction using the system of FIG. 2.

FIG. 3A is a flowchart depicting one embodiment of a process 300 for monitoring a transaction. Process 300 will be discussed with reference to FIG. 2 in which for purposes of discussion Managed Application 6a will be referred to as an "Upstream Application" and Managed Application 6b will be referred to as a "Downstream Application." Likewise, Agent 8a will be referred to as an "Upstream Agent" and Agent 8b as a "Downstream Agent." Of course, being upstream or downstream is not a fixed property of a Managed Application 6 or Agent 8, but is relative to another Managed Application 6 or Agent 8. For example, Managed Application 6b is upstream from Managed Application 6c and Agent 8b is upstream with respect to Agent 8c. In some embodiments, process 300 is performed by Agents 8 that monitor a Managed Application 6 that received a request to process a transaction from another Managed Application 6 that is being monitored. For example, referring to FIG. 2, Agents 8b and 8c may perform process 300 as the applications they monitor receive requests from another application that is being monitored. However, Agent 8a does not need to perform process 300 because there is no application upstream from it that is being monitored.

In step 302, Downstream Application 6b receives a request from Upstream Application 6a to process a transaction. For example, Downstream Application 6b receives a request from Downstream Application 6a to perform a credit card check. This will cause Downstream Application 6b to execute one or more lines of software code. The lines of code could be one or more methods, processes, threads, etc.

Figure 5A:
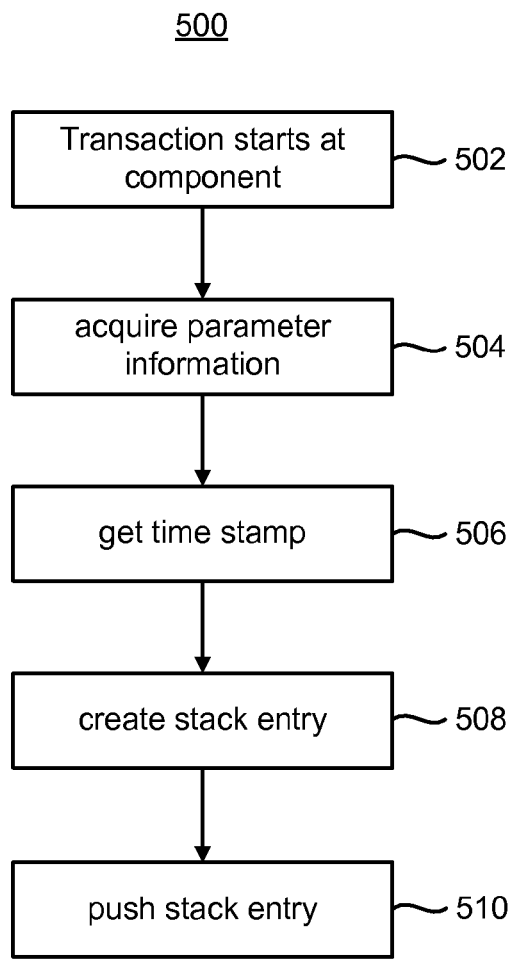
FIG. 5A is a flowchart describing one embodiment of a process for starting the tracing of a transaction at a Managed Application.

In step 304, the transaction starts and Downstream Agent 8b starts to monitor the transaction that is executed by Downstream Application 6b. For example, Downstream Agent 8b monitors the execution of the method(s), process(es), thread (s) that were started in step 302. FIG. 5A provides further details of the Agent starting to monitor the transaction when the transaction starts.

Figure 5B:
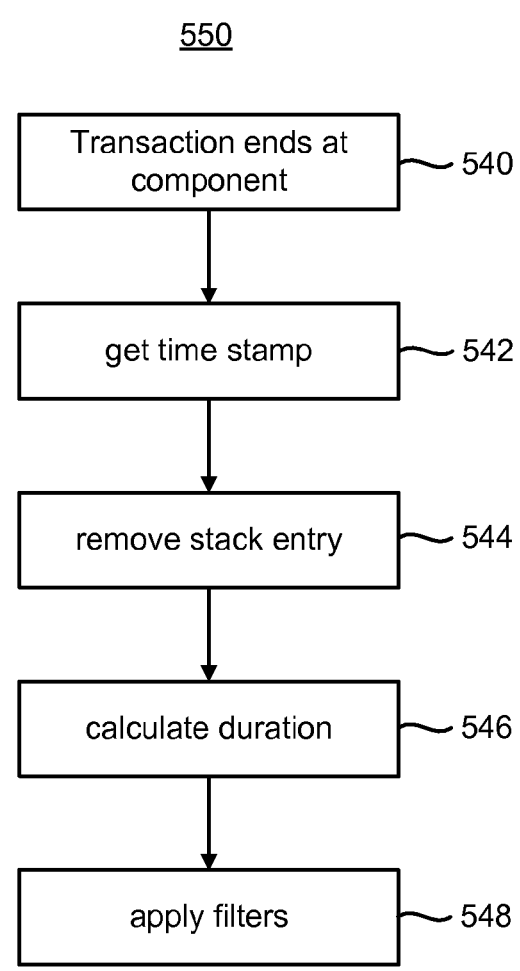
FIG. 5B is a flowchart describing one embodiment of a process for concluding the tracing of a transaction at a Managed Application.

In step 305, the transaction completes at Downstream Application 6b and Downstream Agent analyzes the transaction. For example, the method (or methods) being monitored completes. In some cases, a first method may call a second method, which may call a third method, etc. The methods may complete in the reverse order. In this case, the transaction can be considered to have completed when the first method completes. FIG. 5B provides further details of the Agent analyzing the transaction after the transaction completes. The dashed line between steps 304 and 305 indicates that a substantial gap in time may occur between these two steps. For example, Downstream Application 6b may send request 224b to Managed Application 6c and wait for response 226b.

In step 306, Downstream Agent 8b determines whether one or more filter conditions are satisfied (or violated). For example, if the duration for which the transaction executed by Downstream Application 6b exceeds a threshold (e.g., one second), then the filter condition is satisfied. Further details of filters are discussed with respect to the process in FIG. 4.

If the filter condition(s) are satisfied then control passes to step 307, in which Downstream Agent 8b reports data regarding performance of the transaction by Downstream Application 6b to Enterprise Manager 120. Step 307 may include Downstream Agent 8b building performance data based at least in part from data sent to it by the probes. In one embodiment, the performance data includes the name of the transaction, the type of the transaction, the start time of the transaction, the duration of the transaction. Other information can also be part of the performance data. Downstream Agent 8*b* reports the performance data by sending the performance data to Enterprise Manager 120. In one embodiment, the data is sent via the TCP/IP protocol.

In step 308, Downstream Agent 8*b* propagates data that instructs Upstream Agent 8*a* to report data regarding execution of the transaction by Upstream Application 6*a*. Note that step 308 occurs in response to the filter condition being satisfied (step 306), in this embodiment. However, Downstream Agent 8*b* could determine that the propagation data is sent based on a different test.

In one embodiment, to propagate the data, Downstream Agent 8*b* inserts a token in the response that Downstream Application 6*a* sends Upstream Application 6*a* that concludes the request/response interaction. The token can be placed in the header of an HTTP response or the header of a Simple Object Access Protocol (SOAP) response or the header of a JAVA Message Service (JMS) response. In these examples, the token is placed in a response at the application layer of the protocol stack (also referred to as communications stack). Note that in some cases it may be difficult or impossible to include the token in a response at the application layer. However, the token could be placed in a response at a different layer of the protocol stack. For example, with reference to the Internet Protocol Suite (Also known as TCP/IP), the token could be placed in a response at the transport layer. A specific example of placing the token in the transport layer is to place the token in a Transport Control Protocol (TCP) response. The token might also be returned in a response at a different layer of the Internet Protocol Suite. Also note that it is not required that the Internet Protocol Suite be used for communication.

Propagating the data to instruct other Agents 8 to report data does not require that a token be placed in a response. In one embodiment, Downstream Agent 8*b* sends a message to Enterprise Manager 120 which, in turn, sends a message to Upstream Agent 8*a* that Upstream Agent 8*a* to report data regarding execution of the transaction by Upstream Application 6*a*. Note that Upstream Agent 8*a* is not being instructed to report performance data for all transactions. Further details are discussed below.

In step 310, Upstream Agent 8*a* sets a reporting flag upon receiving the propagated data and determining that performance data for the transaction should be reported to Enterprise Manager 120. In one embodiment, Upstream Agent 8*a* parses the response from Downstream Application 6*b* to determine whether the token was included in the response. In one embodiment, Upstream Agent 8*a* determines whether it received the previously discussed message from Enterprise Manager 120 instructing it to report the data for this particular transaction.

If Downstream Agent 8*b* determined that other Agents 8 should not be instructed to report data for this transaction, then Downstream Agent 8*b* does not propagate data that instructs Upstream Agent 8*a* to report the performance data (step 314). Note that Downstream Agent 8*b* may also instruct Agent 8*c* to report data regarding execution of the transaction by Managed Application 6*c*.

Figure 3B:
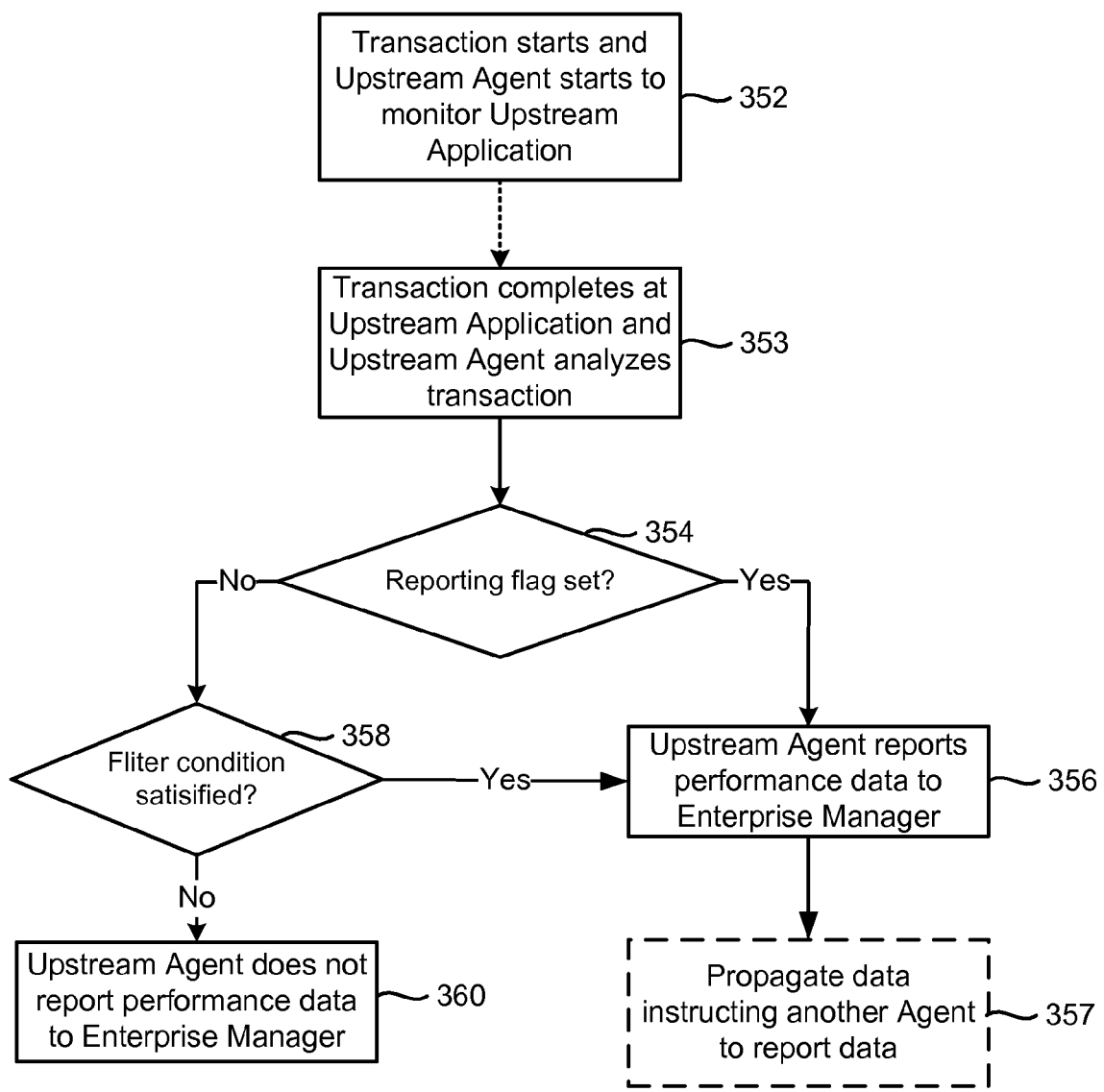
FIG. 3B is a flowchart of one embodiment of a process of an Upstream Agent determining whether to report performance data.

FIG. 3B is a flowchart of one embodiment of a process 350 of an Upstream Agent determining whether to report performance data. Process 350 will be discussed by continuing the example in which Managed Application 6*a* is an Upstream Application from Managed Application 6*b*. In step 352, Upstream Agent 8*a* monitors execution of the transaction by Upstream Application 6*a*. In one embodiment, Upstream Agent performs the process of FIG. 5A to monitor the transaction. The dashed line between steps 352 and 353 indicates that a substantial gap may occur between steps 352 and 353. For example, Upstream Application 8*a* may request that Downstream Application 8*b* handle part of the transaction. In step 353, the transaction completes at Upstream Agent 8*a*, and Upstream Agent 8*a* analyzes the transaction. In one embodiment, Upstream Agent 8*a* performs the process of FIG. 5B to analyze the transaction.

In step 354, Upstream Agent 8*a* determines if the reporting flag is set. Recall that the reporting flag may have been set in step 310 of process 300. If the reporting flag is set, then Upstream Agent 8*a* reports the performance data to Enterprise Manager 120 (step 356).

If the reporting flag is not set, then Upstream Agent 8*a* determines whether a filter criterion was satisfied (step 358). If the filter criteria was satisfied, then Upstream Agent 8*a* reports the performance data to Enterprise Manager 120 (step 356). For example, if Upstream Application 6*a* took too long to complete, then Upstream Agent 8*a* might report the performance data even though the reporting flag was not set. After step 356, Upstream Agent 8*a* could propagate data to other Agents 8 instructing those Agents to report performance data (step 357). For example, if Upstream Application 6*a* had received a request from a Managed Application upstream from it, then Upstream Agent 8*a* could propagate data to the Agent 8 monitoring that further Upstream Application (not depicted in FIG. 2)

If the reporting flag is not set and the filter criteria was not satisfied (step 358), then Upstream Agent 8*a* does not report the performance data. Data that was collected for this transaction may thus be discarded without ever sending performance data to Enterprise Manager 120. In one embodiment, an entire stack entry is discarded. Collecting data on a stack is further discussed below. In another embodiment, only the parameters and timestamps are discarded. In other embodiments, various subsets of data can be discarded.

Figure 4:
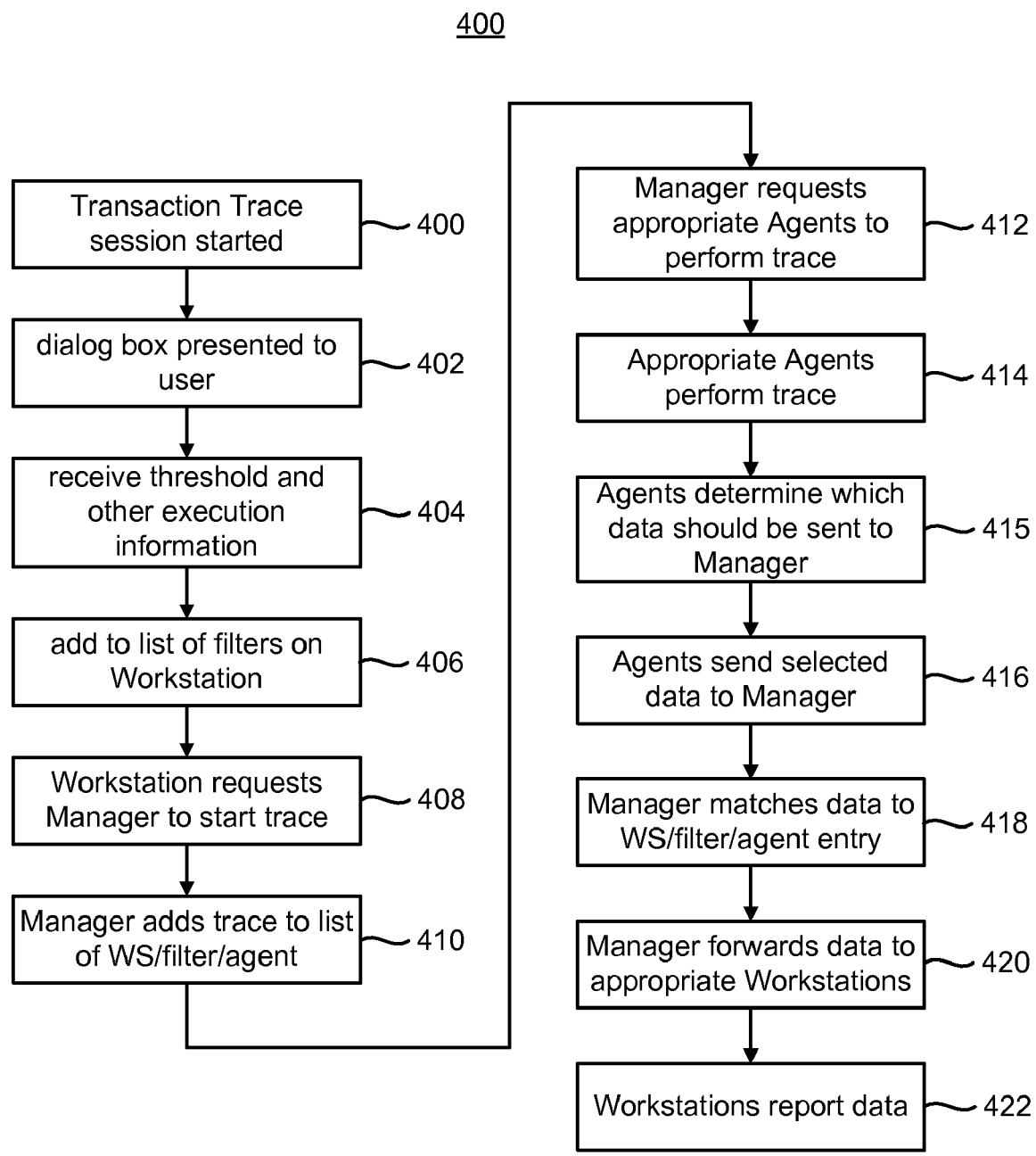
FIG. 4 is a flow chart describing one embodiment of a process for starting the tracing of a transaction.

FIG. 4 is a flowchart describing one embodiment of a process 400 for tracing transactions using the system of FIG. 2. This process describes steps that an administrator takes to use the system and also discusses details of the filters mentioned above. In step 400, a transaction trace session is started. In one embodiment of step 400, a window is opened and an administrator will select a dropdown menu to start a transaction trace session. In other embodiments, other techniques can be used to start the session. In step 402, a dialog box is presented to the administrator. This dialog box will ask the administrator for various configuration information. In step 404, the various configuration information is provided by the administrator by typing information into the dialogue box. Other means for entering the information can also be used within the spirit of embodiments. One variable entered by the administrator in step 404 is the threshold trace period. That is, administrator enters a time, which could be in seconds, milliseconds, microseconds, etc. The system will only report those transactions that have an execution time longer than the threshold period provided. For example, if the threshold is one second, then Agents 8 will only report transactions if the execution time for a particular Managed Application 6 is more than one second for that transaction. In some embodiments, step 404 only includes providing a threshold time period. In other embodiments, other configuration data can also be provided. For example, the administrator can identify an Agent, a set of Agents, or all Agents. Note that there may be many more Agents in the system than are depicted in FIG. 2. In one embodiment, only identified Agents will perform the transaction tracing described herein. In another embodiment, Enterprise Manager 120 will determine which Agents to use. Another configuration variable that can be provided is the session length. The session length indicates how long the system will perform the tracing. For example, if the session length is ten minutes, the system will only trace transactions for ten minutes. At the end of the ten minute period, new transactions that are started will not be traced; however, transactions that have already started during the ten minute period will continue to be traced. In other embodiments, at the end of the session length all tracing will cease regardless of when the transaction started. Other configuration data can also include specifying one or more userIDs or other data of interest to the administrator. For example, the userID is used to specify that the only transactions initiated by processes associated with a particular one, or more userIDs will be traced. Other parameters can also be used to identify which transactions to trace. Note that even if the Agents are instructed to trace certain transactions, they should not report all of the data or those transactions as discussed herein. The information provided in step 402 is used to create a filter.

In step 406 of FIG. 4, the workstation adds the new filter to a list of filters on the workstation. In step 408, the workstation requests Enterprise Manager 120 to start the trace using the new filter. In step 410, Enterprise Manager 120 adds the filter received from the workstation to a list of filters. For each filter in its list, Enterprise Manager 120 stores an identification of the workstation that requested the filter, the details of the filter (described above), and the Agents to which the filter applies. In one embodiment, if the workstation does not specify which Agents the filter applies to, then the filter will apply to all Agents. In step 412, Enterprise Manager 120 requests the appropriate Agents to perform tracing.

In step 414, the appropriate Agents perform the trace. Note that performing the trace may include collected data, but they Agents do not necessarily report the collected data to Enterprise Manager 120. In step 415, Agents determine which trace data should be sent to Enterprise Manager 120. The process of FIG. 3A is one implementation of an Downstream Agent instructing an Upstream Agent that it should report the trace data (also referred to as performance data). The process of FIG. 3B is one implementation of an Upstream Agent determining that it should report the trace data based on the instruction from Downstream Agent. In step 416, the Agents performing the trace send the selected performance data to Enterprise Manager 120.

In step 418, Enterprise Manager 120 matches the received data to the appropriate workstation/filter/Agent entry. In step 420, Enterprise Manager 120 forwards the data to the appropriate workstation(s) based on the matching in step 418. In step 422, the appropriate workstations report the data. In one embodiment, the workstation can report the data by writing information to a text file, to a relational database, or other data container. In another embodiment, a workstation can report the data by displaying the data in a GUI. More information about how data is reported is provided below.

As noted above, the Agents perform the tracing of the transactions. In some embodiments, an Agent uses a stack to temporarily store information about transactions. When transactions are started, they are pushed onto a stack. When transactions are completed, they are popped off the stack. In one embodiment, each transaction on the stack has the following information stored: type of transaction, a name used by the system for that transaction, a hash map of parameters, and a timestamp for when the transaction was pushed onto the stack. A data structure other than a stack can be used.

In some embodiments, the Agents leverage what is called Blame technology. Blame Technology works in a managed Java Application to enable the identification of component interactions and component resource usage. In this embodiment, the stack has sub-elements, which are entries for other components (e.g. methods, process, procedure, function, thread, set of instructions, etc.) that are started from within the transaction of interest. Further details of Blame Technology are discussed in U.S. patent application Ser. No. 10/318,272, which has previously been incorporated herein by reference in its entirety.

FIG. 5A is a flowchart describing one embodiment of a process 500 for starting the tracing of a transaction at a Managed Application 6. FIG. 5A describes one implementation of step 304 of process 300. In one embodiment, the steps of FIG. 5A may be performed by each Agent that monitors a particular transaction. For example, Agents 8a-8c may perform this process. For the sake of discussion, Downstream Agent 8b monitoring Downstream Application 6b will be used when discussing the process of FIG. 5A. In step 502, a transaction starts. For the sake of illustration, a method in Downstream Application 6b starts. The method is invoked in response to Downstream Application 6b receiving a request from Upstream Application 6a to perform a transaction.

In step 504, Downstream Agent 8b acquires the desired parameter information. In one embodiment, an administrator can configure which parameter information is to be acquired via a configuration file or the GUI (see process of FIG. 4). The acquired parameters may be stored in a hash map, which is pushed onto the stack that was previously discussed. In other embodiments, the identification of parameters are pre-configured. There are many different parameters that can be stored. In one embodiment, the actual list of parameters used is dependent on the application being monitored.

In step 506, Downstream Agent 8b acquires a timestamp indicating the current time. In step 508, a stack entry is created. In step 510, the stack entry is pushed onto the stack. In one embodiment, the timestamp is added as part of step 510.

FIG. 5B represents one embodiment of a process 550 as a transaction finishes. FIG. 5B describes one implementation of step 305 of process 300. In one embodiment, the steps of FIG. 5B may be performed by each Agent that monitors a particular transaction. For example, Agents 8a-8c may perform this process. For the sake of discussion, the example from FIG. 5A of Downstream Agent 8b monitoring Downstream Application 6b will be continued when discussing the process of FIG. 5B.

In step 540, the transaction (e.g., method) ends. In step 542, the system acquires the current time. In step 544, the stack entry that was pushed on the stack in step 510 (FIG. 5A) is removed. In step 546, the execution time of the transaction is calculated by comparing the timestamp from step 542 to the timestamp stored in the stack entry. In step 548, the filter for the trace is applied. For example, the filter may include a threshold period of one second. Thus, step 548, would include determining whether the calculated duration from step 546 is greater than one second. This concludes monitoring the transaction.

Continuing with the example in which Downstream Application was monitored, after step 546, step 306 from process 300 may be performed. That is, Downstream Agent 8b determines whether a filter criteria was satisfied. However, if Upstream Agent 8a was performing the process of FIG. 5B, then step 354 of FIG. 3B may be performed next.

In some embodiments, a token is added to a response from a Downstream Application to a request from an Upstream Application in order to propagate information that other Agents should report trace data. However, it is not required that the token be added to a response. In one embodiment, a message is sent on a pre-existing communication connection to propagate the information that other Agents should report performance data. Using a pre-existing communication connection avoids overhead that might otherwise negatively impact system performance. For example, when opening a communication connection there might be additional steps such as making certain that a firewall is in place.

FIG. 6 is a diagram of one embodiment of a system 600 in which a pre-existing communication connection is used to propagate information that other Agents should report trace data. In general, the system 600 includes application servers 202, 212 and management server 223. These servers may be running the same programs that were discussed in connection with FIG. 2. Managed Application 6a has a communication connection 606 with Managed Application 6b. Connection 606 may be the link that is used to send the request 224a and response 226a. Connection 606 may be a TCP/IP connection, for example. Thus, connection 606 can be uniquely identified by a source IP address, source port number, destination IP address, and destination port number. As a specific example, source IP address is an IP address of Application Server 302, source port number is a port number of Managed Application 6a, destination IP address is an IP address of Application Server 312, and destination port number is a port number of Managed Application 6b. Agent 8a has a communication connection 608 with Enterprise Manager 120 and Agent 8b has a communication connection 604 with Enterprise Manager 120. Connections 604 and 608 may be TCP/IP connections. Port numbers for connection 604 may be port numbers for Agent 8b and Enterprise Manger 120. Port numbers for connection 608 may be port numbers for Agent 8a and Enterprise Manger 120. IP addresses may be IP addresses of servers 302, 312, and 223. Note that connections 604, 606, and 608 are not required to be TCP/IP. Also note that it is not required that all Managed Applications communicate over the same type of communication connection.

FIG. 7 is a flowchart illustrating one embodiment of a process 700 of using a pre-existing communication connection is used to propagate information that other Agents should report trace data. The system 600 of FIG. 6 will be referred to when discussing process 700. In step 702, a communication connection 604 is established between Downstream Agent and Enterprise Manager 120. In step 704, a communication connection 608 is established between Downstream Agent and Enterprise Manager 120. Connections 604 and 608 may be established at any time after agents 8a, 8b are installed on servers 302, 312 and are maintained while system 600 is in operation monitoring transactions.

When Downstream Application 6b receives a request to perform a transaction from Application (step 705), control passes to step 706. In step 706, Downstream Application 6b processes the transaction based on the request from Upstream Application 6b. In step 708, Downstream Agent 8b determines that trace data for the transaction should be reported to Enterprise Manager 120. As already discussed, this determination may be made based on determining that a filter criterion was satisfied.

In step 710, Downstream Agent 8b sends a message to Enterprise Manager 120 on connection 604. By using a pre-existing communication connection 604, there is no overhead for establishing a communication connection (and possibly firewalls). Therefore, sensing this message does not need to consume considerable resources.

In step 712, Enterprise Manager 120 sends a message to Upstream Agent 8a on connection 608. Again, by using a pre-existing communication connection 608, there is no overhead for establishing a communication connection (and possibly firewalls).

In step 714, Upstream Agent 8a sets a flag that indicates that performance data for this transaction should be reported to Enterprise Manager 120. Setting this flag may be similar to setting a flag if Upstream Agent 8a determined that the previously discussed token was in a response from Managed Application 6b. However, in this case, the messages passed to and from Enterprise Manager 120 are not responses to requests.

Then, the process returns to step 705 to wait for the next request from Upstream Application 6a to process the next transaction. Thus, the connections 604, 608 are persistent in the sense that they are maintained while more transactions are processed.

Note that sending the token in the response is another technique for using a pre-existing communication connection 606 in order to propagate the information that the performance data should be reported to Enterprise Manager 120.

Embodiments can be accomplished using hardware, software, or a combination of both hardware and software. The software used for the various embodiments is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers. In one embodiment, software is used to program one or more processors. The processors can be in communication with one or more storage devices, peripherals and/or communication interfaces.

Figure 8:
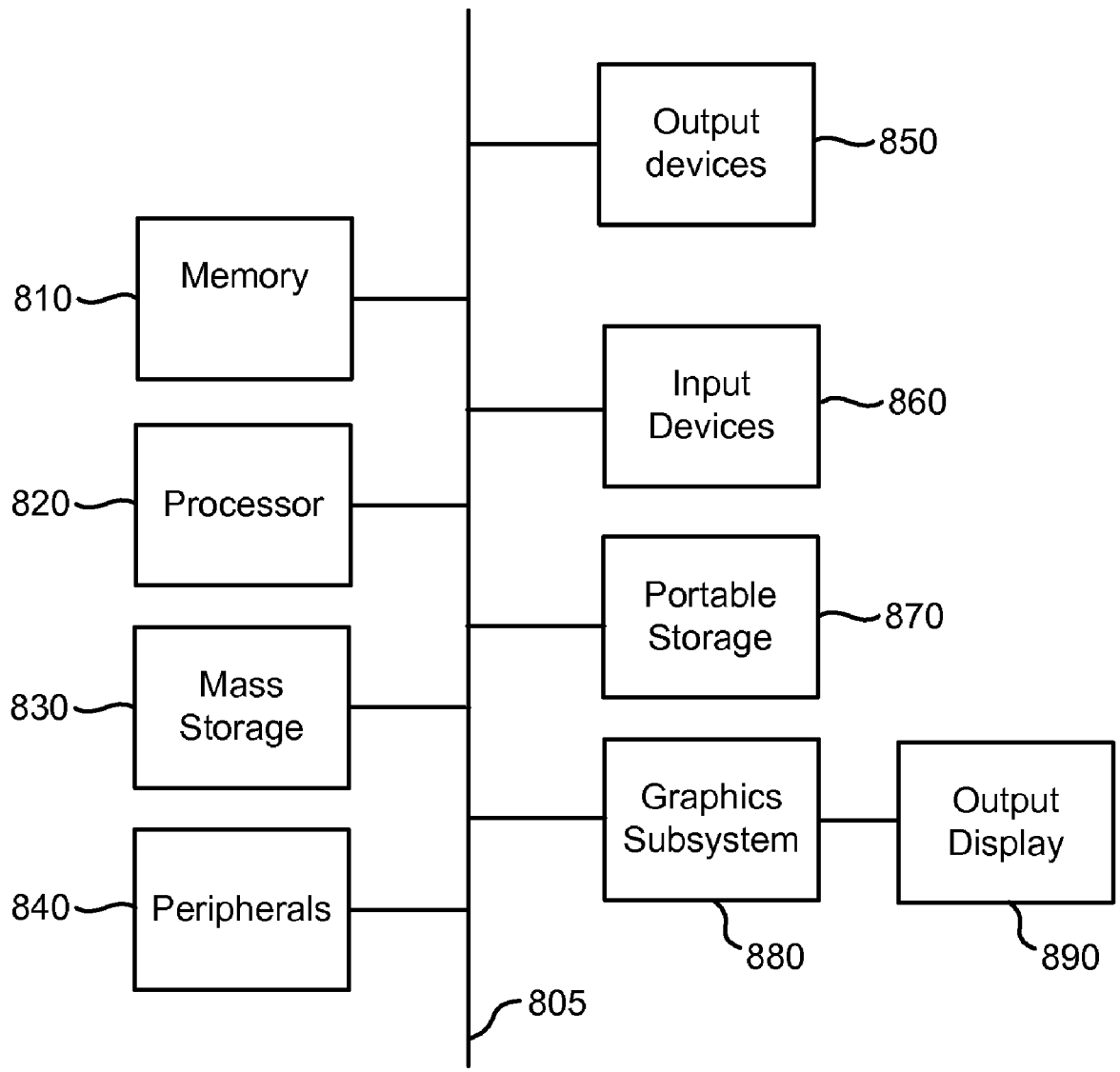
FIG. 8 is a block diagram of an embodiment of a computing system.

FIG. 8 is a block diagram of an embodiment of a computing system. In some embodiments, the computing system of FIG. 8 is used to implement one or more of client device 207, Application Servers 202, 212, 222, and/or Management Server 223. The computer system of FIG. 8 includes one or more processors 820 and main memory 810. Main memory 810 stores, in part, instructions and data for execution by processor unit 820. If the system is wholly or partially implemented in software, main memory 810 can store the executable code when in operation. The system of FIG. 8 further includes a mass storage device 830, peripheral device(s) 840, output devices 850, user input device(s) 860, portable storage medium drive(s) 870, a graphics subsystem 880 and an output display 890. For purposes of simplicity, the components shown in FIG. 8 are depicted as being connected via a single bus 805. However, the components may be connected through one or more data transport means. For example, processor unit 820 and main memory 810 may be connected via a local microprocessor bus, and the mass storage device 830, peripheral device(s) 840, portable storage medium drive (s) 870, and graphics subsystem 64 may be connected via one or more input/output (I/O) buses. Mass storage device 830, which may be implemented with a magnetic disk drive or an optical disk drive, is a non-volatile storage device for storing data and instructions for use by processor unit 820. In one embodiment, mass storage device 830 stores the system software for implementing various processes described here (e.g., 300, 350, 400, 500, 550, 700) for purposes of loading to main memory 810.

Portable storage medium drive 870 operates in conjunction with a portable non-volatile storage medium, such as a floppy disk, to input and output data and code to and from the computer system of FIG. 8. System software for implementing embodiments is stored on such a portable medium, and is input to the computer system via the portable storage medium drive 870. Peripheral device(s) 840 may include any type of computer support device, such as an input/output (I/O) interface, to add additional functionality to the computer system. For example, peripheral device(s) 840 may include a network interface for connecting the computer system to a network, a modem, a router, etc.

User input device(s) 860 provides a portion of a user interface. User input device(s) 860 may include an alpha-numeric keypad for inputting alpha-numeric and other information, or a pointing device, such as a mouse, a trackball, stylus, or cursor direction keys. In order to display textual and graphical information, the computer system of FIG. 8 includes graphics subsystem 880 and output display 890. Output display 890 may include a cathode ray tube (CRT) display, liquid crystal display (LCD) or other suitable display device. Graphics subsystem 880 receives textual and graphical information, and processes the information for output to display 890. Additionally, the system of FIG. 8 includes output devices 850. Examples of suitable output devices include speakers, printers, network interfaces, monitors, etc.

The components contained in the computer system of FIG. 8 are those typically found in computer systems suitable for use with embodiments, and are intended to represent a broad category of such computer components that are well known in the art. Thus, the computer system of FIG. 8 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, and other suitable operating systems.

The above discussion contemplates that the filter used by the Agent to determine whether to report a transaction is based on execution time. In other embodiments, other tests can be used. Examples of other tests include choosing based on UserID, provide a random sample, report any transaction whose execution time varies by a standard deviation, etc.

The above discussion contemplates that Downstream Agent propagates data that instructs Upstream Agent to report performance data to Enterprise Manager. In other embodiments, Downstream Agent propagates data that serves other functions. For example, Downstream Agent could instruct Upstream Agent to collect a different type of data. For example, if Downstream Agent is performing a check of a credit card, Upstream Agent might be requested to collect data that could be used to analyze a potentially fraudulent financial transaction.

Thus, as disclosed herein, one aspect is a machine implemented method for monitoring transactions that includes the following steps. Execution of a transaction by a first application is monitored by a first software entity executing on a first computing device. Performance data that relates to execution of the transaction by a first application is generated. Execution of the transaction by a second application is monitored by a second software entity. The transaction is executed by the second application based on a request from the first application. A determination is made, based on the monitoring, that the first software entity should report the performance data to a third software entity that executes on a second computing device. Based on determining that the first software entity should report the performance data, data is propagated that indicates that the first software entity should report the performance data. The first software entity reports the performance data to the third software entity in response to the first software entity receiving the propagated data.

Another aspect is a machine implemented method for monitoring transactions that includes the following steps. Execution of a transaction by a first application is monitored by a first software entity executing on a first computing device. Performance data is generated based on monitoring the transaction execution. A response from a second application to the first application is parsed to determine whether the response indicates that the first software entity should report the performance data. The response is to a request from the first application to the second application to process the transaction. The performance data is reported to a second software entity on a second computing device if the response indicates that the first software entity should report the performance data. Based at least in part on determining that the response does not indicate that the first software entity should report the performance data, a determination is made that the performance data should not be reported to the second software entity.

Systems that include computing devices for monitoring transactions are also disclosed herein. Processor readable storage devices having processor readable code embodied therein that when executed on a processor monitor transactions are also disclosed herein.

The foregoing detailed description of embodiments has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

We claim:

1. A machine implemented method for monitoring transactions, comprising the steps of:

monitoring a transaction that is executed by a first application, the monitoring performed by a first software entity at a first computing device;

generating performance data that relates to execution of the transaction by the first application, the performance data is generated by the first software entity based on monitoring the transaction;

monitoring, by a second software entity, the transaction while the transaction is being executed by a second application, the transaction is executed by the second application based on a request from the first application, the second software entity resides on the same or a different computing device as the first software entity;

determining that the first software entity should report the performance data, the determining is based on the monitoring performed by the second software entity;

propagating data that indicates that the first software entity should report the performance data, the data is propagated based on determining that the first software entity should report the performance data; and reporting the performance data to a third software entity that executes on a second computing device, the performance data is reported to the third software entity by the first software entity in response to the first software entity receiving the propagated data.

2. A machine implemented method for monitoring transactions as recited in claim 1, wherein the step of propagating data includes adding a token in a response from the second application to the first application, the token indicates that the first software entity should report the performance data, the response from the second application is a response to the request from the first application.

3. A machine implemented method for monitoring transactions as recited in claim 1, further comprising the step of:
setting a flag that indicates that the first software entity should report the performance data, the flag is set by the first software entity based on analyzing the propagated data; and
determining that the performance data should be reported to the third software entity based on the flag being set.

4. A machine implemented method for monitoring transactions as recited in claim 1, wherein the step of propagating data includes propagating data on an existing communication connection.

5. A machine implemented method as recited in claim 4, wherein the step of propagating data on an existing communication connection includes:
propagating first data on a first communication connection between the second software entity and the third software entity, the first data indicates that the first software entity should report the performance data, the first communication connection exists prior to determining that the first software entity should report the performance data.

6. A machine implemented method as recited in claim 5, further comprising the step of:
propagating second data on a second communication connection between the first software entity and the second software entity, the second data indicates that the first application should report the performance data, the second communication connection exists prior to determining that the first software entity should report the performance data.

7. A machine implemented method as recited in claim 4, wherein the step of propagating data on an existing communication connection includes:
propagating data on a communication connection between the first application and the second application that exists prior to determining that the first software entity should report the performance data.

8. A machine implemented method as recited in claim 1, wherein if the first software entity fails to receive the propagated data the first software entity discards the performance data without reporting the performance data to the third software entity.

9. A machine implemented method as recited in claim 1, further comprising propagating data, based on the monitoring performed by the second software entity, that indicates that the first software entity should collect and report data other than the performance data to the third software entity.

10. A system for monitoring software, comprising:
a first computing device that includes first monitoring software that monitors execution of a transaction by a first application on the first computing device, the first monitoring software generates performance data that relates to execution of the transaction by the first application;
a second computing device that includes second monitoring software that monitors execution of the transaction by a second application on the second computing device, the transaction is executed by the second application in response to a request from the first application to execute the transaction, and
a third computing device that includes third monitoring software, the third monitoring software has a communication connection with the first monitoring software;
the second monitoring software determines that the first monitoring software should report the performance data to the third monitoring software based on monitoring the execution of the transaction by the second application, the second monitoring software propagates data that indicates that the first monitoring software should report the performance data, the data is propagated based on determining that the first monitoring software should report the performance data; and
the first monitoring software reports the performance data to the third monitoring software over the communication connection in response to receiving the propagated data.

11. A system for monitoring software as recited in claim 10, wherein the second monitoring software propagating data includes the second monitoring software adding a token in a response from the second application to the first application, the token indicates that the first monitoring software should report the performance data to the third monitoring software, the response is to the request from the first application to the second application to execute the transaction.

12. A system for monitoring software as recited in claim 11, wherein the communication connection is a first communication connection, and the second monitoring software has a second communication connection with the third monitoring software, the second communication connection is in existence prior to determining that the first monitoring software should report the performance data, the second monitoring software propagates first data to the third monitoring software on the second communication connection that indicates that the first monitoring software should report data the performance data to the third monitoring software.

13. A system for monitoring software as recited in claim 12, wherein the first communication connection is in existence prior to determining that the first monitoring software should report the performance data, the third monitoring software propagates second data on the first communication connection to the first monitoring software that indicates that the first monitoring software should report the performance data.

14. A system for monitoring software as recited in claim 10, wherein the communication connection between the first monitoring software and the third monitoring software is a first communication connection, the first application has a second communication connection with the second application, the second monitoring software propagates the data using the second communication connection.

15. One or more processor readable storage devices having processor readable code embodied on the processor readable storage device, the processor readable code which when executed on one or more processors causes the one or more processors to perform a method comprising the steps of:
monitoring execution of a transaction by a first application, the monitoring execution being performed by a first portion of the processor readable code at a first computing device;
generating performance data that relates to execution of the transaction by the first application, the first portion of the processor readable code generates the performance data based on monitoring execution of the transaction by the first application;
monitoring execution of the transaction by a second application, the monitoring execution of the transaction by a second portion of the processor readable code, the transaction is executed by the second application based on a request from the first application;

determining that the first portion of the processor readable code should report the performance data to a second computing device, the determining is based on the monitoring performed by the second portion of the processor readable code;

including a token in a response from the second application to the first application that indicates that the first portion of the processor readable code should report the performance data, the response is to a request from the first application to the second application to process the transaction; and reporting the performance data in response to receiving the propagated data, the first portion of the processor readable code reports the performance data to the second computing device.

16. The one or more processor readable storage devices of claim 15, wherein the processor readable code further contains code which, when executed on the one or more processors, causes the one or more processors to perform the further step of:

discarding the performance data without reporting the performance data to the second computing device if the propagated data is not received by the first portion of the processor readable code.

17. A machine implemented method for monitoring transactions, comprising the steps of:

monitoring execution of a transaction by a first application, the monitoring being performed by a first software entity executing on a first computing device;

generating performance data based on monitoring the execution of the transaction;

parsing a response from a second application to the first application to determine whether the response indicates that the first software entity should report the performance data to a second software entity on a second computing device, the response is to a request from the first application to the second application to process the transaction;

reporting the performance data to the second software entity on the second computing device if the response indicates that the first software entity should report the performance data; and determining that the performance data should not be reported to the second software entity based at least in part on determining that the response does not indicate that the first software entity should report the performance data.

18. A machine implemented method for monitoring transactions of claim 17, further comprising:

determining whether execution of the transaction by the first application meets a criterion for reporting the performance data to the second software entity; and reporting the performance data to the second software entity if the criterion is satisfied.

19. A machine implemented method for monitoring transactions of claim 18, further comprising:

discarding the performance data without reporting the performance data to the second software entity if the criterion is not satisfied and if the response does not indicate that the first software entity should report the performance data to the second software entity.

20. A processor readable storage device having processor readable code embodied on the processor readable storage device, the processor readable code which when executed on a processor causes the processor to perform a method comprising the steps of:

monitoring execution of a transaction by a first application, the monitoring is performed by the processor readable code executing on the processor on a first computing device;

generating performance data based on monitoring the execution of the transaction;

parsing a response from a second application to the first application to determine whether the response contains a token that indicates that the processor readable code should report performance data regarding execution of the transaction by the first application to a second computing device, the response is to a request from the first application to the second application to process the transaction;

reporting the performance data to the second computing device entity if the response contains the token; and determining that the performance data should not be reported to the second computing device based at least in part on determining that the response does not contain the token.

* * * * *